May 7, 1968    P. H. LEMPKE    3,381,694
COIN-HANDLING APPARATUS
Filed Aug. 12, 1966    10 Sheets-Sheet 1

Fig. 1

INVENTOR.
Paul H. Lempke
BY
Attorneys

INVENTOR.
Paul H. Lempke
BY Flehr ——— Swain
Attorneys

May 7, 1968 P. H. LEMPKE 3,381,694
COIN-HANDLING APPARATUS
Filed Aug. 12, 1966 10 Sheets-Sheet 7

Fig. 14

INVENTOR.
Paul H. Lempke
BY
Attorneys

Fig. 15

May 7, 1968  P. H. LEMPKE  3,381,694
COIN-HANDLING APPARATUS
Filed Aug. 12, 1966  10 Sheets-Sheet 9

INVENTOR.
Paul H. Lempke
BY
Attorneys

May 7, 1968    P. H. LEMPKE    3,381,694
COIN-HANDLING APPARATUS
Filed Aug. 12, 1966    10 Sheets-Sheet 10

INVENTOR.
Paul H. Lempke
BY
Attorneys

United States Patent Office

3,381,694
Patented May 7, 1968

3,381,694
COIN-HANDLING APPARATUS
Paul H. Lempke, Reno, Nev., assignor to Nevada Electronics, Reno, Nev., a corporation of Nevada
Filed Aug. 12, 1966, Ser. No. 572,037
15 Claims. (Cl. 133—1)

ABSTRACT OF THE DISCLOSURE

A vertical riser channel adapted to receive coins from an accept/reject mechanism and containing helical coin lift screw for carrying coins upwardly in edge-to-edge relation to be delivered to a hopper and coin receiving tube means. In one form of the invention the upper end of the track is arranged to separate coins for alternate delivery to a pair of tubes. A coin discharge mechanism for discharging coins from the bottom of each coin stack within a tube is also provided. In one form of the invention the coins are alternately discharged from each of the pair of tubes.

---

This invention relates to coin handling apparatus, and particularly to such apparatus adapted to receive coins, accumulate them in stacks, and subsequently to eject them upon predetermined signal. Such coin handling apparatus is useful, for example, in coin changing machines, vending equipment and the like. The apparatus is particularly suited for use in coin handling systems such as those described in Tiedemann U.S. Patent 3,168,179 for "Coin Handling Device," issued Feb. 2, 1965, and in U.S. patent application Serial No. 337,083, filed Jan. 10, 1964, for "Coin Handling Apparatus," in the names of Manning and Tiedemann, both assigned to the same assignee as herein.

In general, in apparatus of the type described, it is desired that the coins being processed are handled swiftly and reliably. To this end the mechanisms employed should be as simple and reliable as possible. Heretofore, machines of this type have moved coins by various types of reciprocating elements such as pneumatic and hydraulic actuators, electric solenoids and the like, alternatively, motors have been used together with mechanisms for converting the usual rotary motion to reciprocating motion. In general, such elements add to the cost of the apparatus and detract from its reliability. Additionally, the movement of coins by reciprocating elements is characterized by a significant amount of dead time for returning the element to its starting position. There is, therefore, a need for improved coin handling apparatus.

In general, it is an object of this invention to provide a coin handling apparatus which will overcome the above mentioned disadvantages and limitations.

A further object of the invention is to provide a coin handling apparatus of the above character in which the principal coin moving functions are accomplished directly by rotary motion to permit use of a simplified mechanism.

An additional object of the invention is to provide an apparatus of the above character which is very positive in its operation and which is capable of receiving and discharging coins quite rapidly and reliably.

Further objects and features of the invention will appear from the following description in which preferred embodiments of the invention have been set forth in detail in conjunction with the accompanying drawing.

Referring to the drawing.

In general, the coin handling apparatus of the invention is organized around means defining a vertical riser channel or coin track for guiding a column of coins upwardly in their own planes in edge to edge relation. Screw type elevating means mounted in the lower end of the channel, serves to advance coins in the coin track. As coins advance to the upper end of the track, they are transferred, under gravity, through a hopper assembly, into one or more coin storage tubes wherein they are formed into an equal number of cylindrical, vertical stacks. A rotating coin discharge mechanism having means directly engaging the lowermost coin of a stack serves to dispense coins from the apparatus.

Figure 2:
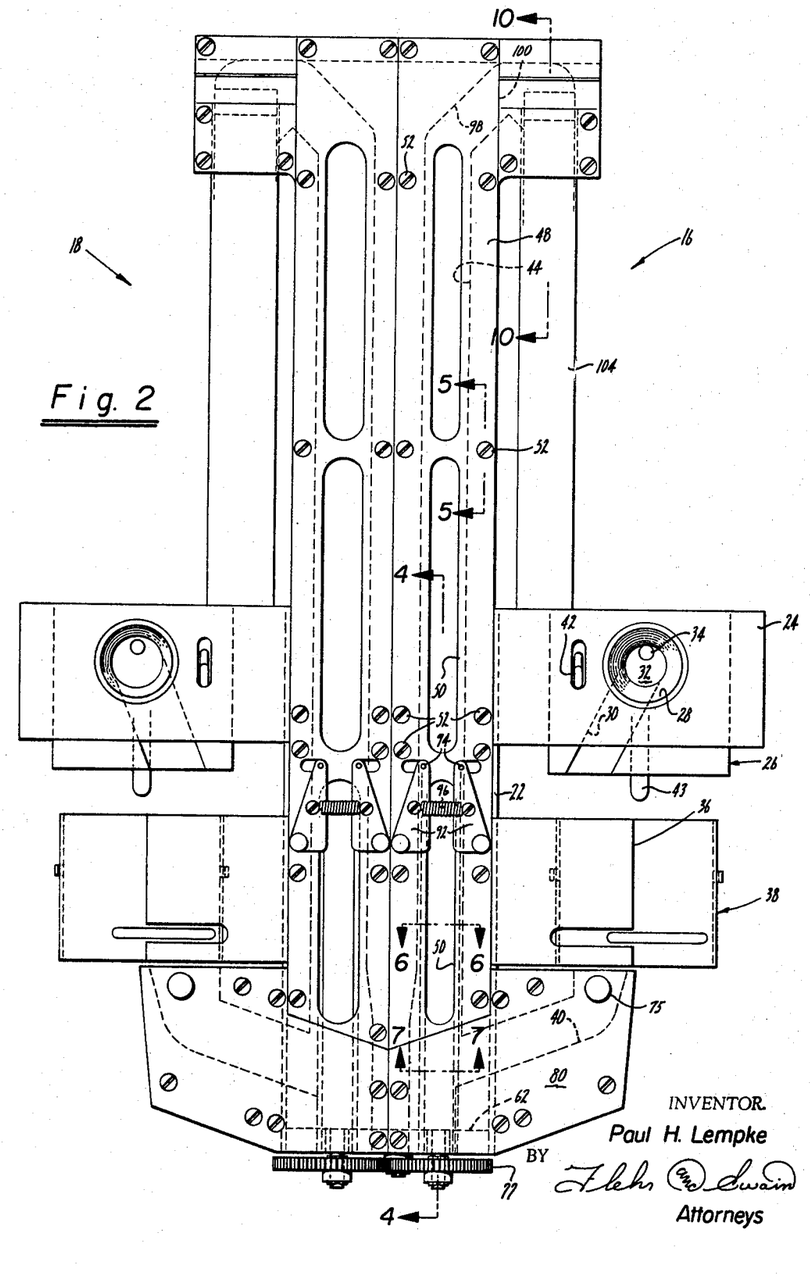
FIGURE 2 is a front view of the coin handling apparatus of FIGURE 1, taken along the line 2—2.

In general, the devices shown in the drawings consist of coin handling apparatus having two sections which are mirror images of each other except for scale factor to account for different sizes of coins. As shown in FIGURE 2, the right section 16 of the machine is designed to accommodate quarters while the left section 18 of the machine is designed to accommodate half dollars. In any given application, several sections are assembled together, the total number being equal to the number of coin denominations to be handled. For example, if a change bank is desired which will handle half dollars, quarters, dimes and nickels, then it is obviously appropriate that two pair of sections would be selected, i.e., four sections, one for each denomination. Since the sections are either identical or mirror images, it is not necessary to show or describe more than one such section, and, the nomenclature, function, numbers and description will be understood to be the same for each.

Referring now more particularly to FIGURES 1–8, there is shown, and now described in detail, a coin receiver, coin accept-reject mechanism, and coin lifting mechanism.

COIN RECEIVER

A base member 20 supports side plates 22 located on each side of the apparatus. Side plates 22 are each provided with an outwardly extending support bracket 24 (FIGURE 2) upon which is mounted a coin receiver section 26. Section 26 incorporates a coin insert well 28 adapted to receive a coin facewise and to admit the same into a channel 30 which extends downwardly and to the exterior of coin receiver section 26. The back wall 32 of insert well 28 is provided with a spring loaded ball 34 protruding partly therethrough such that it must be depressed to permit a coin to pass. The required depression of the ball 34 restricts rapid passage or "fanning" of coins into the machine which could cause jamming.

COIN ACCEPTOR

A second support bracket 36 likewise extends outwardly from each side plate 22 for mounting an accept/reject mechanism, hereinafter referred to only as acceptor 38. The acceptor 38 is located directly below the coin receiver section 26 and is of conventional design to test the genuineness of coins. If the coin is accepted, it drops into a coin receiving slot 40 to be presently described. If the coin is rejected, it is held until an attendant actuates a coin release lever 42 to move plunger 43 downwardly, thereby rejecting it in a conventional manner.

COIN LIFTING MECHANISM

A vertical riser channel or coin track 44 is machined or otherwise formed to extend upwardly and longitudinally along a plate 46. A track cover 48 overlies the track 44 and includes openings 50 narrower than the coin track so as to retain coins in the track. The openings 50 extend along the track for easy viewing of the coin content.

Figures 5, 6, 7, 8:
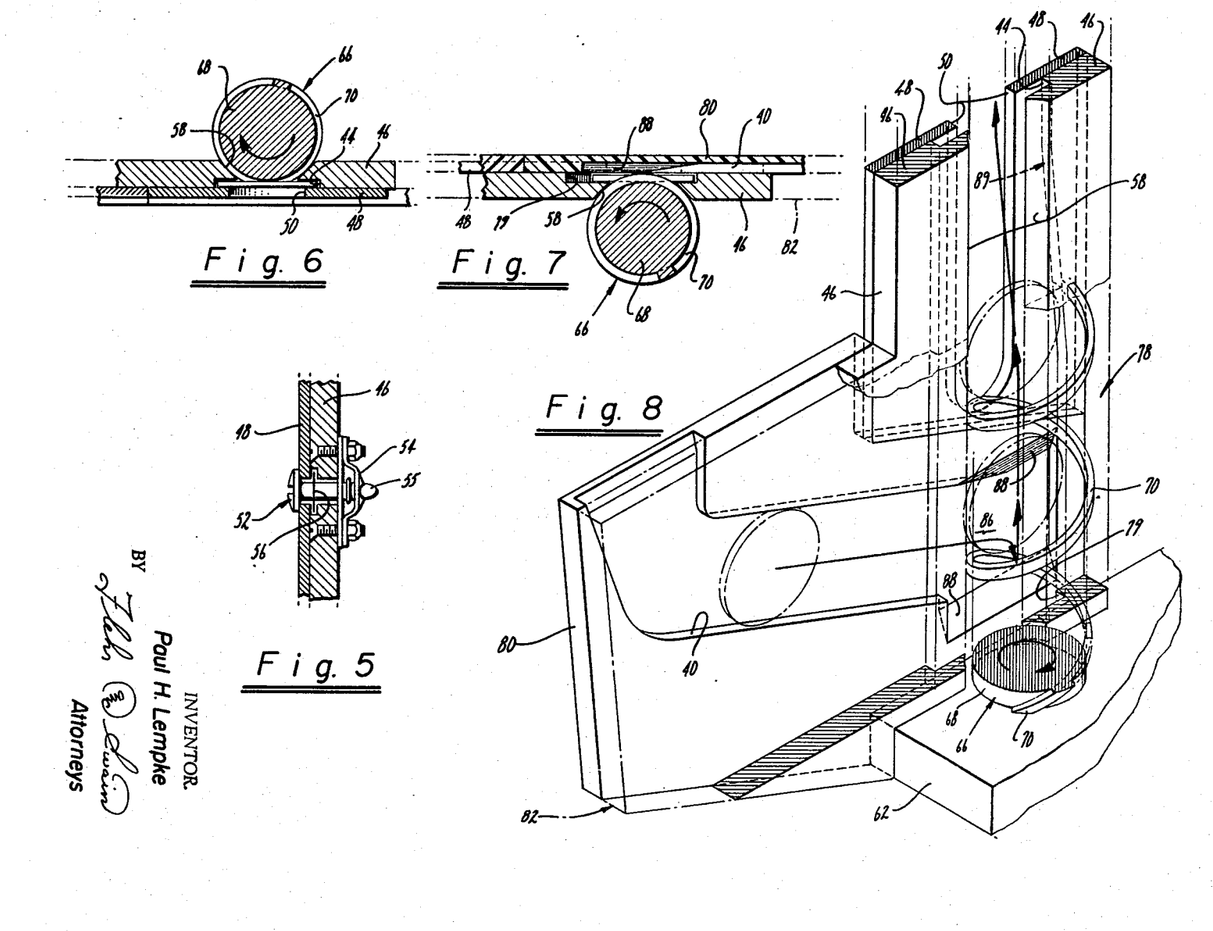
FIGURE 5 is a detail view in section of one of the fasteners utilized in assembling portions of the apparatus, taken along the line 5—5 of FIGURE 2.
FIGURE 6 is a transverse view in cross-section of the coin lifting mechanism, taken along the line 6—6 of FIGURE 2.
FIGURE 7 is a transverse view in cross-section of the coin lifting mechanism taken along the line 7—7 of FIGURE 2.
FIGURE 8 is an isometric view, from the rear, of the coin elevating mechanism of the apparatus, and showing particularly the input path of coins to the coin lifting mechanism.
Figure 9:
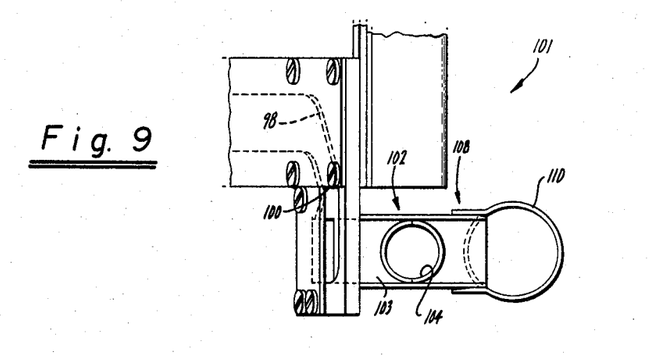
FIGURE 9 is a top view of the apparatus shown in FIGURE 1, taken along the line 9—9, and showing particularly the hopper assembly.
Figure 10:
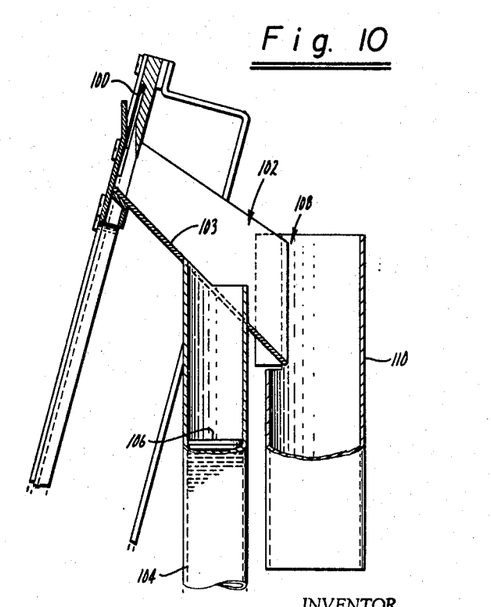
FIGURE 10 is a cross-sectional view of the hopper assembly taken along the line 10—10 of FIGURE 2.

Track cover 48 is held in place by a plurality of quick disconnect fasteners 52 (FIGURE 5). The fasteners include a receiver 54 secured to the plate 46 and a quarter turn screw 55 which passes through track cover 48. A retaining washer 56 captures the screw 52 on the cover 48.

Figure 3:
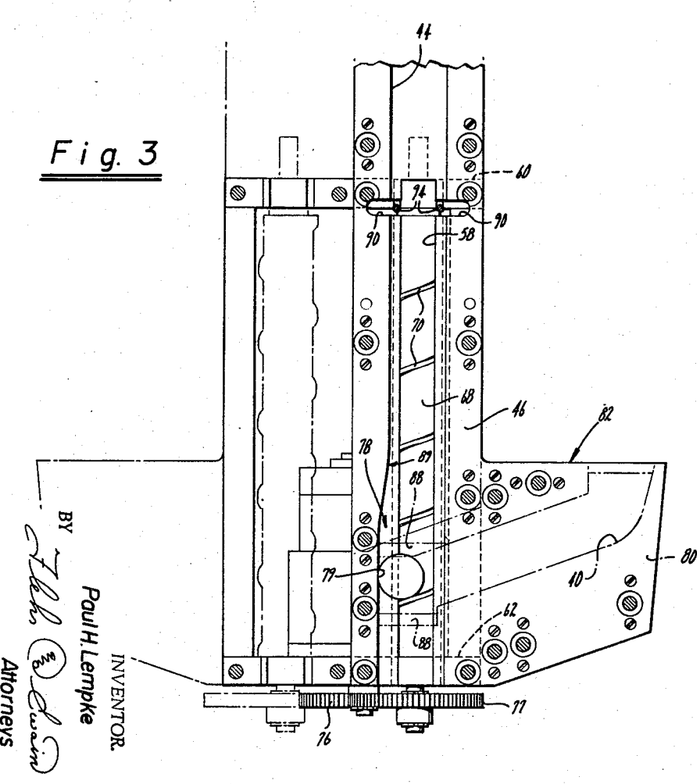
FIGURE 3 is a front view with parts broken away and other parts in phantom lines showing coin elevating mechanism of the apparatus of FIGURE 1, and taken along the line 3—3.
Figure 4:
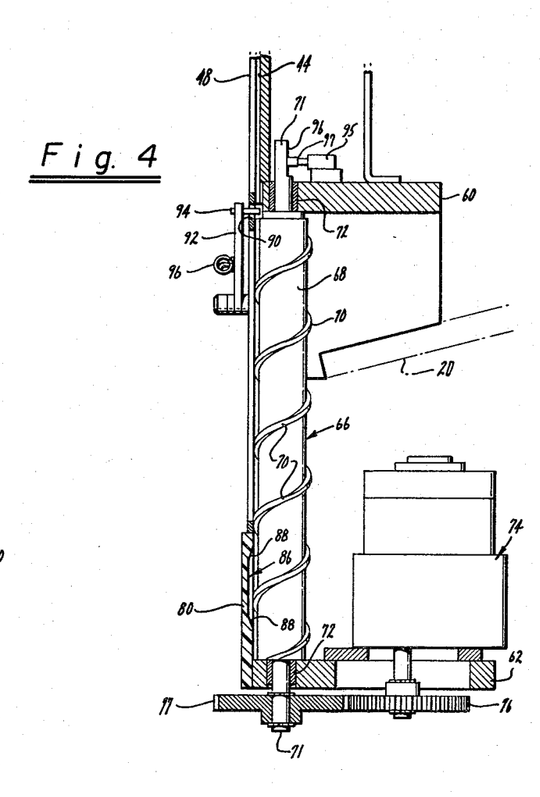
FIGURE 4 is a side view in section of the coin elevating mechanism of the apparatus of FIGURE 2, taken along the line 4—4.

A slot 58 is formed inwardly through the lower end of plate 46 and extends longitudinally along the back wall of the track 44 (FIGURES 3 and 4). A top plate 60 and a bottom plate 62 are mounted on side plate 22 by screws 64 (FIGURE 1) so that the top plate lies adjacent the upper and bottom plate 62 lies adjacent the lower end of slot 58. The top and bottom 60, 62 plates are arranged generally parallel to each other and perpendicular to the plane of the track 44.

A coin elevating screw 66 having a cylindrical shaft 68, a helical rib 70 formed thereabout and axially extending upper and lower journals 71 is rotated in bearings 72 affixed in top and bottom plates 60, 62, respectively. The screw 66 is so positioned and located that its rib 70 extends through the slot 58 and into the coin track 44 by an amount approximately equal to the thickness of a coin (FIGURES 6 and 7). An electric motor 74 is mounted to bottom plate 62 and is rotatably connected to drive the screw 66 through gears 76 and 77. Motor 74 is connected to drive the screw 66 continuously; but alternatively, it may be connected to run for only a predetermined period of time after a coin is sensed in slot 40 such as by a photocell 75 (FIGURE 2). The predetermined period need only be long enough to permit the coin to travel through the lifting mechanism.

Rib 70 of the lifting screw 66 is formed with a rectangular cross section and extends away from shaft 68 a distance of about one coin thickness. The pitch of rib 70 is greater than the diameter of the coin to be handled so that as screw 66 turns, the rib projection moves upwardly carrying a coin disposed between successive turns.

The sidewall 79 of the coin track 44, at which the projection of the rib 70 through the slot 58 lie lowermost, is relieved in the lower region 78. The relieved sidewall 79 serves to laterally feed the coin onto the screw off-center. The amount of relief is related to the coin dimensions as hereinafter described.

A guide plate 80 is fastened to a laterally extending portion 82 of the back plate 46. Plate 80 defines the downwardly directed coin feed slot 40 which receives coins from acceptor 38 and guides them in a plane adjacent and in front of the shaft 68 of screw 66. Upon passing through the slot 40, the coins are dropped into the coin track 44 adjacent the relieved side wall 79. Thus, slot 40 terminates as a recess 86 having upper and lower walls 88 sloping smoothly and opening toward screw 66 to facilitate delivery of the coin to the face of the screw.

Figure 1:
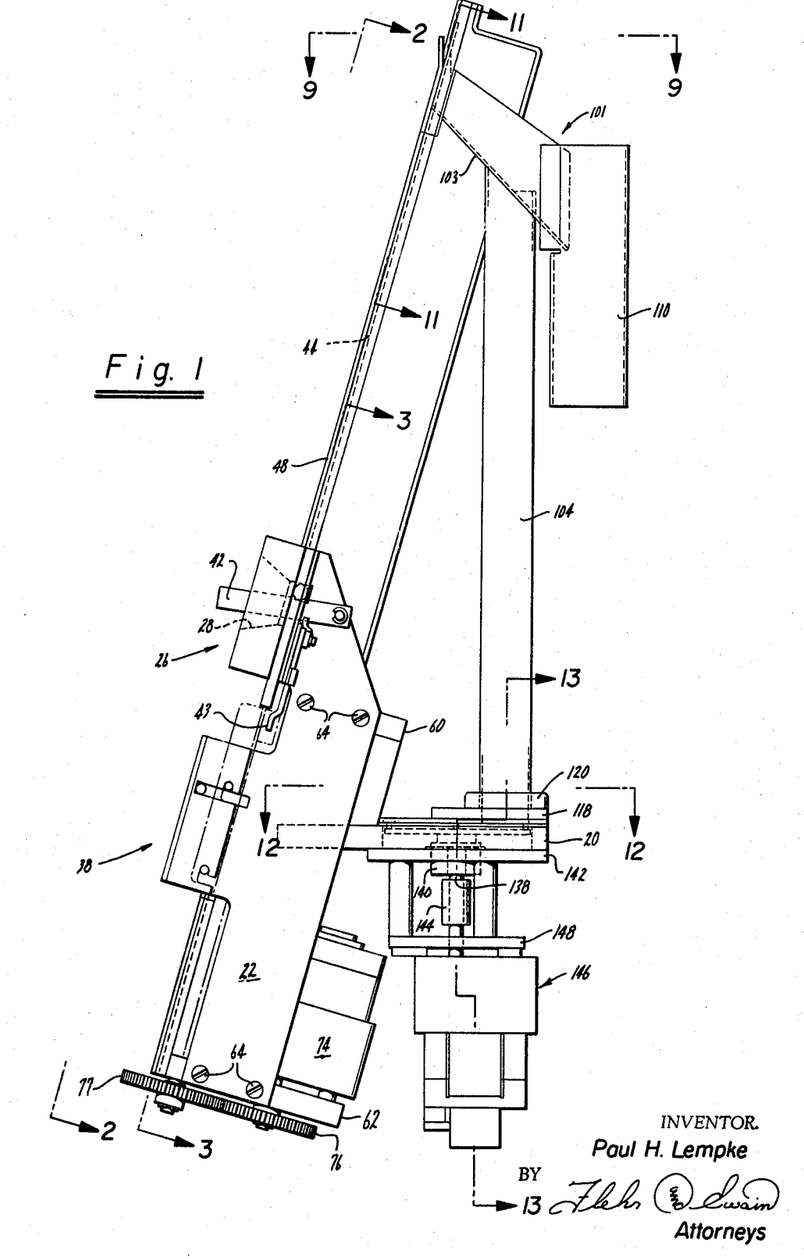
FIGURE 1 is a side view of coin handling apparatus constructed according to the invention.

As seen in FIGURE 1, the entire coin receiving, accepting, and lifting mechanism is tilted approximately 15° from vertical so that the coins, as they pass through this mechanism, lie backward under gravity in contact with the rearward surfaces of support. In this manner the coins ride upon the shaft 68 of the screw and the backwall of coin track 44. This facilitates smooth movement of coins through the apparatus and helps control jamming of coins due to overlapping on "shingling." The angle of tilt also permits the coin to pass easily from the recess 86 onto screw 66 whereby it can be moved upwardly.

The purpose of the off-center feed of the coins onto the screw is to provide maximum control between the rib 70 and the coin when lifting is started and to avoid the possibility of the outer extent of the rib pitching the coin against the guide plate 80. Since the rib 70 lies about a cylindrical shaft 68, its maximum projection through the slot 58 is along the center of the slot. Maximum control between coin and rib can be obtained only along the line of maximum projection of the rib and, consequently, it is desired that the coin contact the supporting rib 70 along the center of the slot 58. If the coin were centered with respect to the screw, the point of contact between coin and rib would not be at the center of the slot but to the right, as viewed in FIGURE 3, by a distance of $r \sin \theta$ where $r$ is the radius of the coin and $\theta$ is the helix angle of screw pitch. By feeding it coins off-center to the left a distance of $r \sin \theta$ the contact between coin and view is at the center of the slot 58. Thus the amount of helix for the side wall 79 is calculated at the radius of the coin times the sine of the pitch angle of the screw 66 and the distance between the side wall 79 and the center of the slot 58 is approximately $r + r \sin \theta$. With such an offset, it has been found that the coins are easily and positively fed onto the screw without jamming or pinching. Furthermore, with the aforementioned tilting of the apparatus, the coins are fed onto the screw by rolling and falling under gravity, and no pressure need be applied to the coin to force it onto the screw 66.

As shown in FIGURE 3, the relief in the sidewall 79 ends at the region 89, so that the coin track 44 is centered over the upper part of the screw 66. However, it will be realized that this is not necessary and that the track may continue to proceed upwardly and offset the aforementioned amount.

Means is provided for boosting the coin clear of the upper end of the screw and for supporting the coin column thereabove to prevent retrograde movement. Thus, track cover 48 is provided with transverse slots 90 just beyond the uppermost end of screw 66. A lever 92 is pivotally mounted on each side of the coin track 44 and one end of each of the levers extends upwardly alongside the track. The levers are joined together by a tension spring 96 and each lever carries a pin 94 extending through one of the slots 90 for movement transversely therein. As a coin is positively advanced upward in the coin track 44, it urges the pins 94 apart. As the center of the coin passes the pins 94, the spring pulls the levers and pins back together and thereby boosts and maintains the coin clear of the upper end of the screw.

A microswitch 95 is secured to the upper side of top plate 60 adjacent an extension of the upper journal 71 through the top plate. Upper journal 71 is formed with a flat 96 on one side adapted to be contacted by a spring loaded arm 97 of microswitch 95 to make and break the switch contacts. Other circuitry (not shown) is connected to the switch 95 and senses the change in the contacts. When the screw stops turning, as by being jammed, the circuitry protectively shuts off motor 74.

HOPPER ASSEMBLY

The hopper assembly 101 is shown primarily in FIGURES 1, 2, 9, 10 and 11 as successive coins are elevated by the screw 66, they accumulate in the coin track 44. A cam surface 98 (FIGURE 2) extends at an angle across the upper end of the track 44 and urges the elevating coins laterally through an exit slot 100 which defines the upper end of the track 44.

The coins drop from exit slot 100 into a coin feed hopper 102 having a coin slide 103 which communicates to a pay-out storage tube 104. Tube 104 is open at its upper end for receiving and accumulating a cylindrical stack 106 of coins. The coin feed hopper 102 also includes an overflow slide 108 which guides excess coins to a coin overflow drain 110.

Thus, there has been described apparatus for the controlled feeding of coins along a predetermined path whereby coins accumulate in a cylindrical stack within the coin collector tube. Means now to be described communicate with the lower end of the tube for discharging or dispensing coins therefrom upon a predetermined signal.

COIN DISCHARGE MECHANISM

Figure 12:
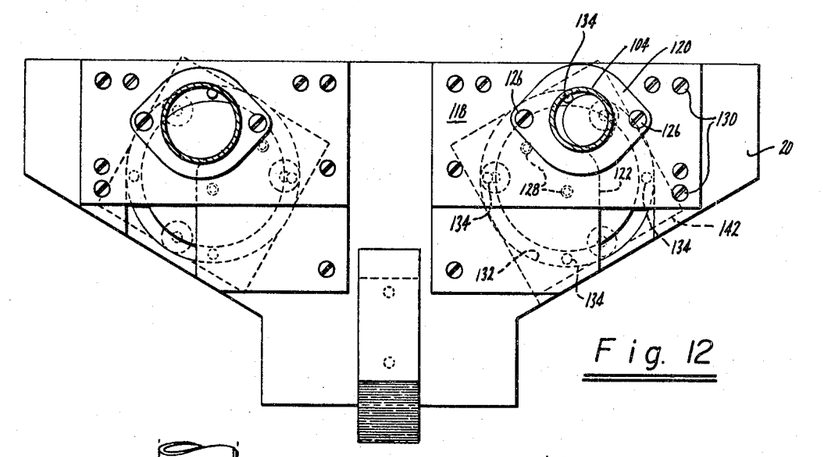
FIGURE 12 is a top view, partly in section, of the pay-out mechanism of the apparatus of FIGURE 1, taken along the line 12—12.

The coin discharge mechanism (shown in FIGURES 1, 12 and 13) closes the bottom of the storage tube 104 and supports a stack of coins in the tube. The mechanism includes the base 20 on which are mounted a coin support plate 112 and spacer 114, a coin guide 116 and a top plate 118, the storage tube being secured to the top plate by a tube guide flange 120. Coin guide 116 and top plate 118 are provided with holes 121 in complete registry with one another and with the interior of the tube. The coin stack passes freely through the holes 121 and rests on the support plate 112 therebelow.

The coin guide 116 defines a J-shaped discharge passageway 122 extending transversely of the coin stack and communicating therewith at the level of the bottommost coin 124. The passageway 122 is dimensioned, disposed and adapted to pass a coin therethrough and out of the apparatus and to cooperate with top plate 118 to retain in the stack that coin which is next above the bottommost.

Flange 120 is retained to top plate 118 by screws 126. Coin guide 116, spacer 114 and coin support plate 112 are retained to top plate 118 and to the base by screws 128 and screws 130, respectively.

The supporting means, including support plate 112, spacer 114 and coin guide 116 are positioned and constructed to define a circular path in the form of a slot 132 which lies on as was in planes below and in the plane of the lowermost coin.

Slot 132 intercepts and extends along passageway 122 from the vicinity directly below the coin stack and toward the point of coin ejection. Preferably, slot 132 is formed in the shape of a circle having a substantially larger diameter than the diameter of the coin being handled. Slot 132 is arranged so that it intersects a projection of the coin stack and largely includes the same.

Upwardly extending stacks or pins 134 are mounted on a plate 136 for travel in the slot 132. Plate 136 is fixed to a shaft 138 carried in a bearing 140 mounted in a bottom plate 142 which is fastened to the underside of base 21. A coupling 144 connects shaft 138 to the output shaft 145 of a motor-brake unit 146. The motor-brake unit is mounted in a plate 148 which is removably fastened below plate 142.

Motor-brake unit 146 contains a motor 147 rotatably connected through suitable gearing 149 to shaft 145. Positive action brake means is connected to motor 147 and serves to stop the motor positively and precisely at a predetermined angle after the motor has been turned off. The brake means comprises a plate 150 having a pair of lugs 151 about its periphery and secured to the motor shaft. A dog 152 is pivotally connected adjacent plate 150 and is spring urged toward the periphery of the same so that the dog can engage one of lugs 151. A solenoid 154 operates dog 152 to hold the same away from plate 150 when energized. Power is supplied to motor 147 from a suitable source through switch 156 and the solenoid 154. Thus, when power is delivered to motor 147, solenoid 154 is also energized to withdraw dog 152 from lug 151. When power is removed, both motor 147 and solenoid 154 are de-energized so as to cause the dog to then engage the next upcoming lug 151 as plate 150 is rotated to thereby stop the motor. In this way, a very positive braking action is achieved, and rotation imparted by the motor is stopped precisely and shortly after the power is removed by opening switch 156. Suitable means (not shown) control the switch 156 to cause ejection of the correct number of coins before the motor is stopped. A suitable motor is Model VW 1-A Gearmotor ⅟₆₀ HP, 115 volts, 60 cycle, 60 r.p.m. with solenoid brake as produced by Von Weise Gear Co., of Watson Industrial Park, St. Louis, Mo.

In the operation of the coin handling apparatus, coins are admitted, one at a time, through the coin insert 28 which passes them to slot 30 communicating with coin acceptor 38. Acceptable coins move from acceptor 38 to slot 40 and slide therealong downwardly and laterally toward the coin lifting mechanism until they enter the recess 86. The coin slides down the lower wall 88 of the recess 86 toward screw 66 until it touches the screw shaft 68. Screw 66 is running continuously so that if the coin is held away from the screw by the rib 70 momentarily, it will touch the shaft as soon as the rib passes by, and will then be engaged by the next successive turn of the rib. At this point, it is possible that the coin may be engaged at its lowermost part by the rib, but be leaning against the outer wall of recess 86. If so, the rib lifts the coin upwardly while the upper portion of the coin rests against the front wall of recess 86. The coin slides thereon until it contacts the upper surface 88 and is cammed toward the screw so that it is brought into position fully against the shaft of the screw. In this manner, the tilted coins are straightened up for upward movement by rib 70.

Figure 11:
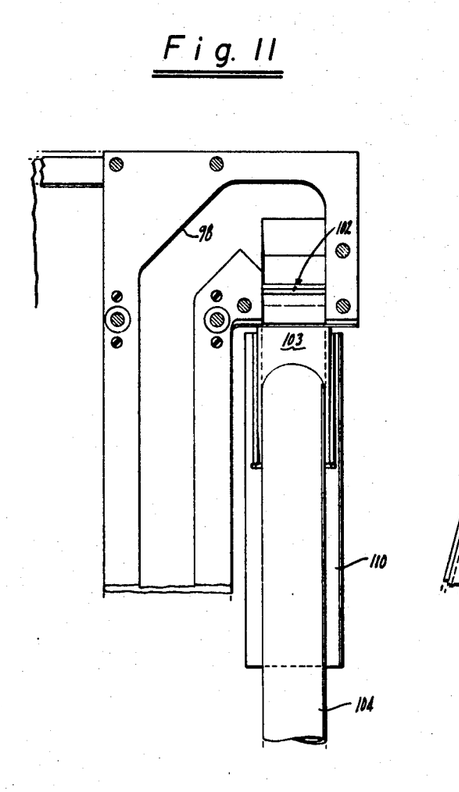
FIGURE 11 is a front view of the hopper assembly and associated storage tube and coin track, taken along the line 11—11 of FIGURE 1.

The screw lifts the coin upwardly until the coin is pushed through the coin pawl mechanism (characterized by pins 94) and is retained thereabove. As successive coins are placed in the machine and lifted by the lifting mechanism, an elongate stack of coins aligned in edge to edge relation is built up along the coin track until the uppermost coin engages the camming surface 98 (FIGURE 11). Additional coins being fed into the apparatus cause the uppermost coin to be pushed to follow the cam surface and dropped through slot 100 onto the coin slide 103, which feeds the coins, to the coin collecting tube 104.

The coins form a cylindrical stack within the coin collecting tube 104 which stack is supported at the bottom by the fixed, non-moving, support member 112. It will be noted that it is possible for one of the driving pins 134 to be positioned beneath the coin stack and thereby cause the bottommost coin to be undesirably tilted at one side. This condition is preferably avoided by affixing the position of plate 150 relative to the shaft 138 so that the pins 134 are positioned laterally away from the bottom of the stack of coins. Nearly all tendency for the coins to jam by being tilted upwardly is avoided in the above construction and by the relative positioning of pins 134 so that they travel a path traversing only one side of the coin stack.

The four pins 134 serve to eject four coins for each revolution of the plate. Since it is very easy to drive the pin carrying plate at, say 60 revolutions per minute, it is easily seen that a large number of coins can be dispensed from the coin storage tube in an extremely short period of time.

FIGURES 14-20 illustrate another embodiment of the invention incorporating certain additional advantageous features. In general, the construction of the embodiment shown in FIGURES 14-20 is similar to that previously described, and like parts have been numbered with a series of numbers two hundred digits higher than their corresponding parts in the embodiment of FIGURES 1-13, notwithstanding certain minor differences between them. Where parts have been substantially changed or differences are important, they will be more fully described hereinafter.

COIN LIFTING ASSEMBLY

Figure 14:
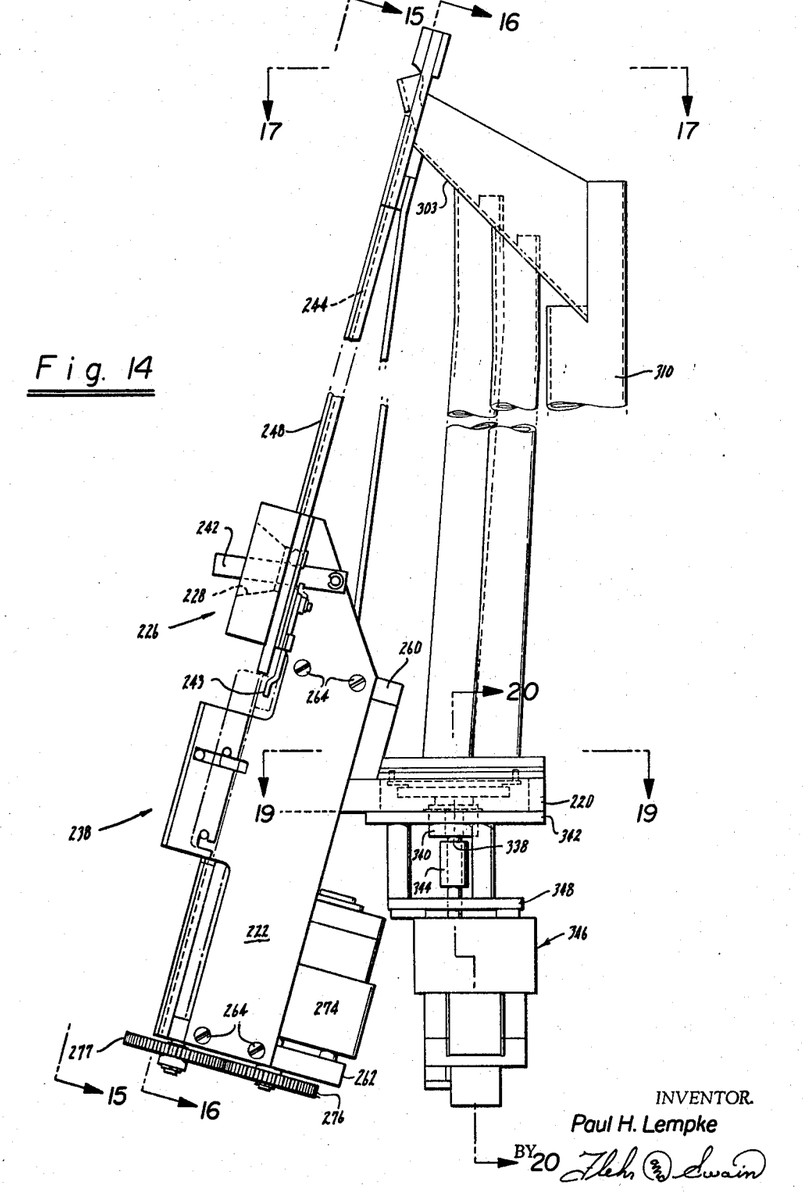
FIGURE 14 is a side view of another coin handling apparatus incorporating the invention.
Figure 15:
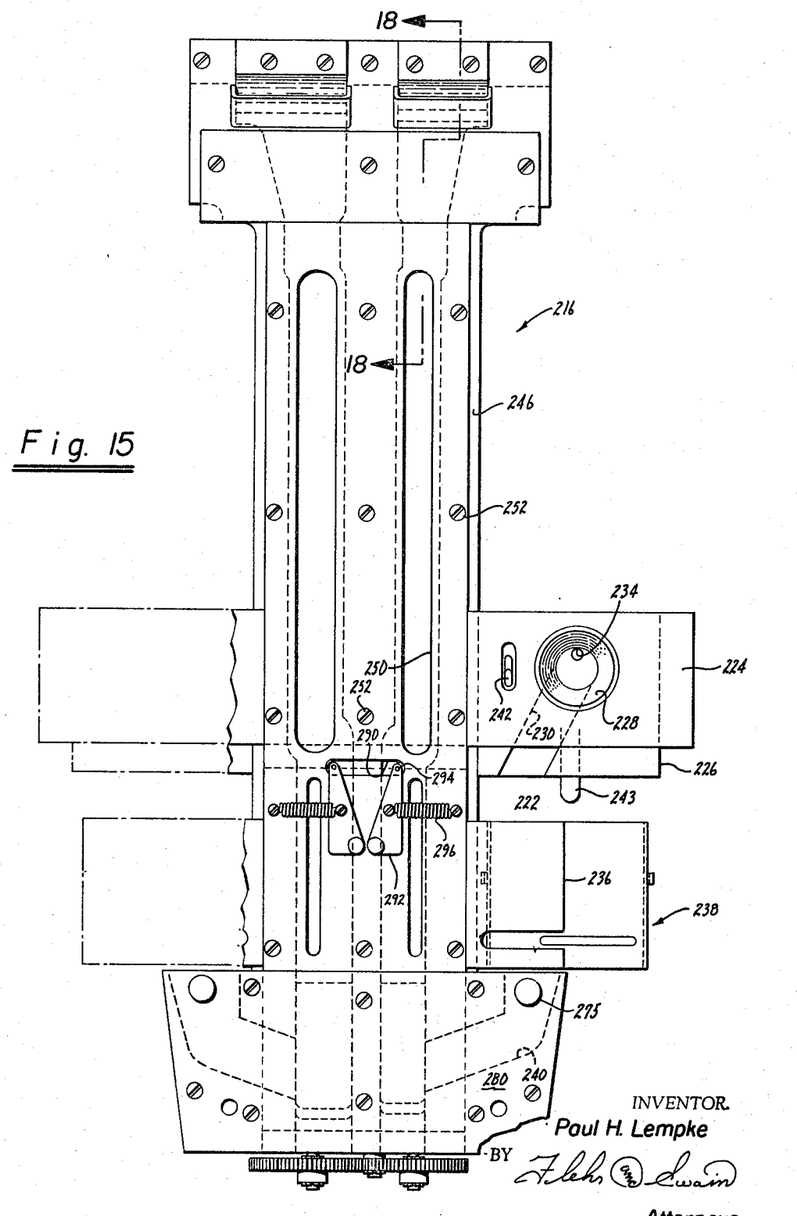
FIGURE 15 is a front view of the coin handling apparatus of FIGURE 14 taken along the line 15—15.
Figure 16:
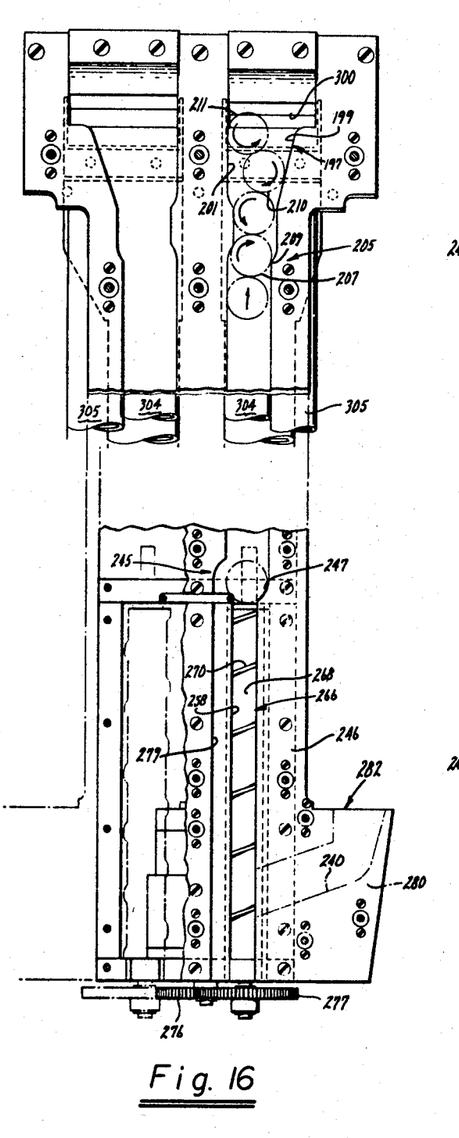
FIGURE 16 is a front view with parts broken away and other parts in phantom lines showing the coin elevating mechanism coin track, and hopper assembly of the apparatus of FIGURE 14 taken along the line 16—16.

Referring now more particularly to FIGURES 14-16, a vertical coin track 244 is machined or otherwise formed along plate 246. A track cover 248 overlies the track 244 and has longitudinally extending openings 250 therein for observing coins. A slot 258 is formed in the lower portion of the plate 246 to accommodate the ribs 270 of a coin elevating screw 266 with this construction coins are raised in the track 244 in substantially the same manner as in with the previously described embodiment.

The coin track 244 is offset in the region adjacent to screw 266 such that the wall 279 occupies a position similar to the wall 79 in the embodiment shown in FIGURE 3. Above the screw 266, the coin track is in alignment with the screw and a slight jog 245 forms the transition between the upper and lower portions of the track. The jog 245 includes a sidewall or surface 247 for supporting the coin.

A lever 292 is pivotally secured adjacent the coin track 244 and carries a pin 294 adapted to extend through a slot 290 formed in the track cover 248. The slot 290 extends partially across the track 244 and a spring 296 urges the lever and pin 294 toward the surface 247. As a coin is raised in the track 244 and through the jog 245, it pushes the pin 245 aside. When partially past the pin 245, the coin is then assisted in its upward movement by the spring 296. The coin may then rest on the pin 294 and the sidewall 247. In this way, retrograde movement of coins is prevented with a minimum number of parts.

HOPPER ASSEMBLY AND FEED MECHANISM THEREFOR

Figure 17:
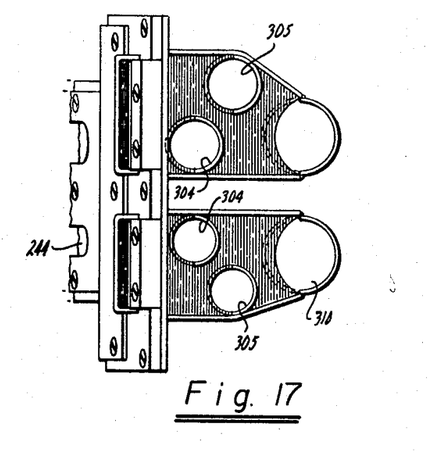
FIGURE 17 is a top view, partly in cross-section, of the apparatus as shown in FIGURE 14 taken along the line 17—17.
Figure 18:
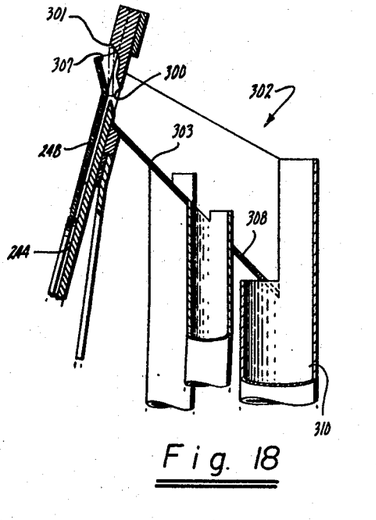
FIGURE 18 is a cross-sectional view of the hopper assembly taken along the line 18—18 of FIGURE 15.

Referring to FIGURES 16-18, as successive coins are elevated by screw 266 along the coin track 244, they are passed through a slot 300 into a hopper assembly 302. The hopper assembly 302 has an inclined coin slide 303 which communicates with a pair of pay-out storage tubes 304 and 305. The hopper 302 also includes an overflow slide 308 which guides excess coins to an overflow drain 310. The additional storage tube is desired in situations requiring an increased capacity of the bank beyond that described and shown hereinbefore in connection with the embodiment of FIGURES 1-12.

Means are provided at the upper end of the riser column for guiding and forming the coins into a configuration such that successive coins are fed alternately to each of said tubes 304 and 305. Such means contains no moving parts but relies entirely upon a sideways sliding and rotational motion of coins about certain camming surfaces. More particularly, the uppermost portion 197 of the coin track is flared such that its sidewalls 199, 201 diverge upwardly and permit successive coins to lie on opposite walls. Thus, once begun, the successive coins tend to push each other against opposing walls. A coin 211, once leaning against a given one of the sidewalls 199, 201, tend to push the next lever coin towards the other sidewall. This pattern maintains itself provided the coin next below the flared portion 197 supports the first coin in the flared section at a position off center.

To assume this off center support, a jog 205 is formed in the coin track for about two coin diameters below the flared portion 197 (FIGURE 16). The lateral extent of the jog is a minor fraction of a coin diameter.

In being elevated, coin 207 tends to rotate about corner 209 and by a gear like action rotates the coins at the start of operation, the first coin to pass the corner 209 takes a natural clockwise rotation and when raised by the second coin takes a counter-clockwise rotation due to the second coins passing corner 209. When the third coin passes the corner 209, it too takes a natural clockwise rotation causing the second coin to rotate counter-clockwise. The counter-clockwise rotation of the second coin not only causes clockwise rotation of the first coin but also urges the first coin against the sloping wall 199. As the first coin is then raised up the sloping wall 199 its rotational sense causes a rolling rather than sliding action on the wall 199. Because of the frictional contact of the coins against the sloping wall 199 they continue their rolling motion up the walls despite the fact that each coin is momentarily rotated clockwise as it passes the jog 205.

It has been found that the amount of flare or divergence should be approximately one and one-half coin diameters at the upper end as compared to approximately a coin diameter for the riser column itself. The length of flared portion 197 is not particularly critical, approximately two coin diameters being satisfactory.

Hopper assembly 302 and storage tubes therein are so mounted that the coins rolling along the sidewall 201 and rotating counterclockwise are fed into storage tube 304 while the clockwise rotating coins rolling along the sidewall 199 are fed into storage tube 305. To facilitate feeding the coins from the coin track to the hopper assembly 302 and to avoid undesirable bouncing the back wall of the coin track 244 has an upwardly and forwardly curving surface 301 above the slot 300 and the track cover 307 has a cooperating inclined surface 307 in alignment with the slot 300. As a coin is raised in the track it is pushed over by the surface 300 onto the surface 307 such that it can slide backwardly through the slot 300 onto the coin clide 303.

COIN DISCHARGE MECHANISM

Figure 19:
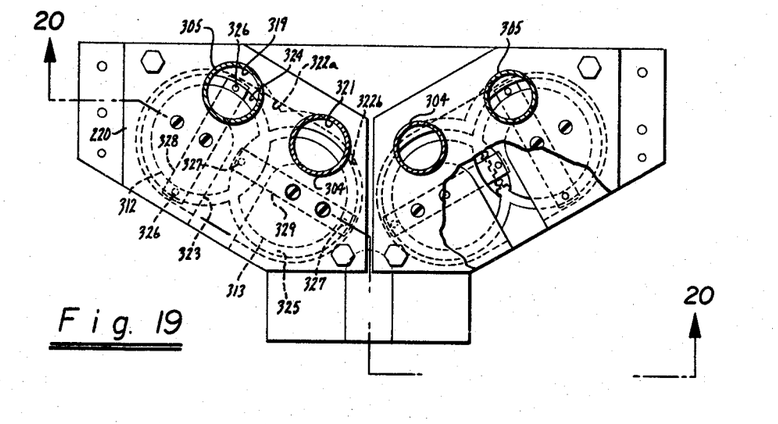
FIGURE 19 is a top view, partly in section, of the pay-out mechanism of the apparatus of FIGURE 14 taken along the line 19—19.
Figure 20:
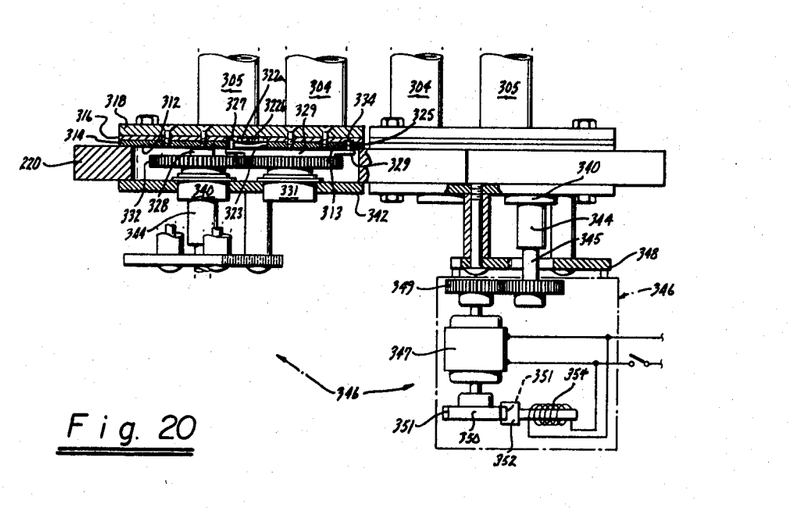
FIGURE 20 is a side view, partly in section, of the pay-out mechanism of the apparatus of FIGURE 14 taken along the lines 20—20 of FIGURES 14 and 19.

The coin discharge mechanism, shown in FIGURES 19 and 20, closes the bottom of the storage tubes 304 and 305 and supports a stack of coins in the tubes. The mechanism includes the base 220 on which are mounted coin support plates 312 and 313, a spacer 314, a coin guide 316, and a top plate 318 to which is fastened each of the storage tubes 304, 305. Both coin guide 316 and top plate 318 are provided with holes 319 and 321 in registry with the coin storage tubes 305 and 304 respectively. The coin stacks in the tubes 305 and 304 pass freely through the holes 319 and 321 and rest on the support plates 312 and 313 respectively.

The coin guide 316 defines a pair of J-shaped discharge passageways 322a and 322b extending transversely of the coin stack and communicating therewith at the level of the bottommost coin. Passageways 322a and 322b are dimensioned, disposed and adapted to pass a coin therethrough and out of the apparatus while cooperating with the top plate 318 to retain in the stack those coins next above the bottommost. J-shaped discharge passageways 322a and 322b are connected together back-to-back to form a common passageway 323 through which coins from both storage tubes 304 and 305 are discharged.

The supporting means including support plates 312 and 313, spacer 314 and coin guide 316 are positioned and constructed to define a circular path in the form of slots 324 and 325 which lie in planes with and below the lowermost coins storage tubes 304 and 305. Slots 324 and 325 intercept and extend along passageways 322a, 322b and 323 from a vicinity directly below each coin stack and toward the point of coin ejection. Preferably, slots 324 and 325 are formed in the shape of circles having substantially larger diameter than the diameter of the coin being handled. Slots 324 and 325 are arranged so that they intersect a projection of the coin stack and continue along a substantial portion of the common passageway 323. Thus, the slots 324, 325 also intersect each other and overlap each other in common passageway 323 as illustrated in FIGURE 19.

One or more upwardly extending studs or pins 326, 327 are mounted on arms 328 and 329 respectively for travel in the slots 324 and 325. As the arms are rotated about their centers the pins contact and carry the lowermost coins through the passageways 322a, 322b and 323.

Figure 13:
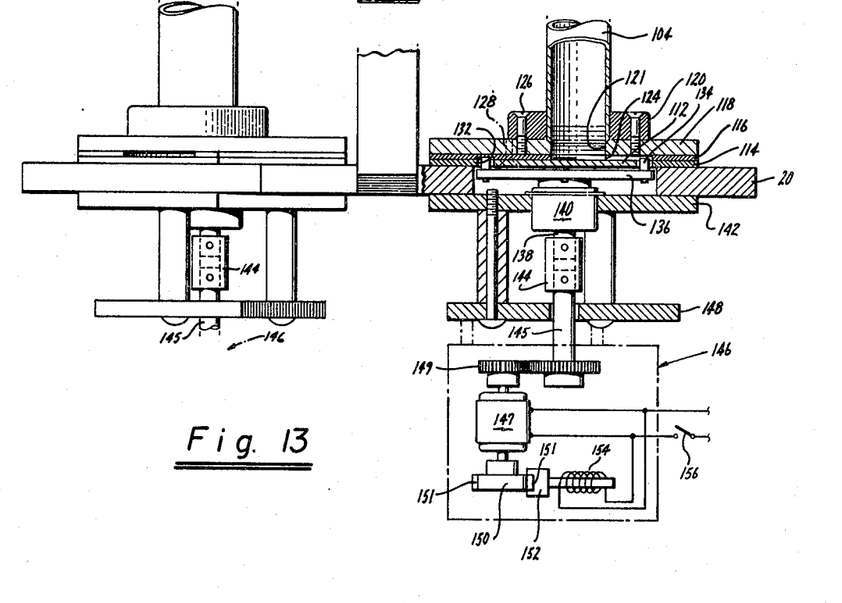
FIGURE 13 is a side view in section of the pay-out mechanism taken along the line 13—13 of FIGURE 1.

Arm 328 is coupled to and rotated by the motor brake unit 346 in the same manner as previously described in connection with the plate 128 and motor unit 146 of FIGURE 13.

Arm 329 is supported by a bearing 331 and is coupled for rotation with arm 328, but in an opposite sense, by means of gearing 332.

The arms are geared together one-quarter revolution apart and pass or overlap each other such that pins 326, 327 of the respective arms alternate in passing through common passageway 323 and in discharging coins.

Thus, there has been provided a particularly reliable coin handling apparatus in which coins are rapidly and positively processed and fed into one or more cylindrical stacks from which they can be easily discharged for payout. By utilizing devices operated directly by rotary motion, high reliability is experienced. Furthermore, the apparatus of the present invention requires only relatively inexpensive power elements, such as electric motors, bearings and gears.

To those skilled in the art to which this invention relates, many changes, modifications and widely differing embodiments will suggest themselves without departing from the spirit and scope of the invention. Accordingly, it should be understood that the disclosures and description herein are intended to be illustrative and that the invention is to be limited only by the following claims.

What is claimed is:

1. In coin handling apparatus, a generally upright coin track for guiding a column of coins upwardly in their own planes in edge to edge relation, said coin track having a slot along a central lower portion thereof, a coin lifting screw including a cylindrical shaft and a helical rib therearound having a pitch greater than the diameter of the coins to be handled, means supporting said screw for rotation adjacent said slot with the helical rib extending into the coin track means for rotating said screw in a direction such that the projection of the rib in the track moves upwardly, guide means defining a downwardly directed coin receiving slot for guiding coins to move by gravity in their own planes to the lower portion of said coin track in engagement with the screw and between successive turns of said rib so that rotation of said screw serves to advance coins upwardly in the coin track.

2. Apparatus as in claim 1 in which said coin track is tilted from vertical so that coins fall and rest on the screw under gravity.

3. Apparatus as in claim 1 together with a pin in said coin track, said pin being resiliently held in the path of said pin out of the path and after a coin passes the pin returns to its path of the column of coin to further boost the coin upwardly and support it in a position clear of the upper end of said screw.

4. Apparatus as in claim 3 in which said coin track includes a lateral offset said offset being a small fraction of a coin diameter and being located above the top of said screw, said pin being in said coin track at said offset.

5. Apparatus as in claim 1 in which said means for rotating said screw includes an electric motor having a rotating shaft output, and gearing connecting said shaft with said screw, said motor and gearing adapted to continuously rotate said screw.

6. Apparatus as in claim 1 in which that side wall of the coin track adjacent to the side of the screw on which the projections of the rib through said slot are lowermost is located at a distance from the center of said slot substantially greater than the radius of said coins.

7. Apparatus as in claim 6 in which said distance corresponds approximately to the value of $r+r \sin \theta$ where $r$ is the radius of the coin being handled and $\theta$ is the helix angle of the screw.

8. Apparatus as in claim 1 in which said guide means an opening at the upper end of said slot for inserting coins face-wise into the slot, spring loaded means disposed behind said opening and adapted to be engaged and depressed by the face of a coin being inserted.

9. In coin handling apparatus, a coin track for passing coins therethrough in edge to edge relation and including sidewalls spaced apart slightly farther than a coin diameter, means for feeding coins along said track the uppermost end of said coin track being flared with upwardly diverging sidewalls so that successive coins tend to be against alternate ones of said sidewalls and a pair of storage tubes each of said storage tube being disposed in communication with one of said sidewalls whereby each tube serves to collect the coins from only one of said sidewalls.

10. Apparatus as in claim 9 in which that portion of the coin track which is flared has a maximum dimension at its uppermost end of approximately one and one-half coin diameters.

11. Apparatus as in claim 9 in which the portion of said coin track next below the flared portion includes a jog, said jog extending about two coin diameters below the bottom of said flared portion.

12. Apparatus as in claim 9 in which said coin track includes a back wall, the upper end of said coin track communicating with said hopper through a slot formed in said back wall said back wall above said slot including an upwardly and forwardly curving surface for camming the upper end of the coin forwardly and out of the plane of said riser column, an inclined surface lying below said curving surface and adapted to receive the coin as the top of the same falls forwardly and downwardly, said inclined surface aligned with said slot for guiding the coin therethrough and into said coin hopper.

13. In coin handling apparatus of the type having means for feeding coins along a predetermined path and for guiding them into adjacent vertically extending storage tubes, support means closing the bottom of each of said storage tubes to support stacks of coins therein, said support means including means defining discharge passageways extending generally transversely of each of said storage tubes and communicating therewith at the level of the bottommost coin in said stacks, each of said discharge passageways being J-shaped and connected together back-to-back to form a common passageway through which coins from both stacks are discharged, said means defining discharge passageways being dimensioned, disposed and adapted to pass the bottommost coin therethrough and out of the apparatus while retaining in each coin stack that coin which is next above the bottommost coin, and means for driving coins alternately from each of said storage tubes and through said discharge passageways.

14. Apparatus as in claim 13 in which said support means includes a slot formed therein below each of said coin stacks and communicating with said discharge passageway and the region of the bottommost coin of the storage stack, said means for driving coins including at least one pin disposed in each said slot and means for supporting the pins for movement along its slot.

15. Apparatus as in claim 14 in which each of said slots is a closed circle, said means for supporting the pins comprising a pair of arms each of said arms carrying a pin at each end thereof and mounted for rotational movement about spaced parallel axes at the same angular speed, said arms being geared together one-quarter revolution apart so that coins are discharged alternately from each of said storage tubes.

References Cited

UNITED STATES PATENTS

| | | | |
|---|---|---|---|
| 2,825,346 | 3/1958 | Gabrielsen | 133—2 |
| 2,848,003 | 8/1958 | Gross | 133—2 |
| 3,155,101 | 11/1964 | Perkins | 133—3 |
| 3,187,759 | 6/1965 | Rausing | 133—3 |

STANLEY H. TOLLBERG, *Primary Examiner.*